US011026192B2

(12) United States Patent
Farrell et al.

(10) Patent No.: US 11,026,192 B2
(45) Date of Patent: Jun. 1, 2021

(54) SYSTEM AND METHOD TO ENHANCE RANGING RESOLUTION FOR LOCALIZATION OF A LORA SENSOR OR DEVICE (71) Applicant: The Provost, Fellows, Scholars and Other Members of Board of Trinity College Dublin, Dublin (IE)

(72) Inventors: Thomas Farrell, Dublin (IE); Haris Kremo, Dublin (IE); Justin Tallon, Dublin (IE)

(73) Assignee: THE PROVOST, FELLOWS, FOUNDATION SCHOLARS AND THE OTHER MEMBERS OF BOARD OF THE COLLEGE OF THE HOLY AND UNDIVIDED TRINITY OF QUEEN ELIZABETH. NEAR DUBLIN ( * ) Notice: Subject to any disclaimer, the term of this patent is extended or adjusted under 35 U.S.C. 154(b) by 0 days.

(21) Appl. No.: 16/754,275

(22) PCT Filed: Oct. 8, 2018

(86) PCT No.: PCT/EP2018/077366
§ 371 (c)(1),
(2) Date: Apr. 7, 2020

(87) PCT Pub. No.: WO2019/068937
PCT Pub. Date: Apr. 11, 2019

(65) Prior Publication Data
US 2020/0383070 A1 Dec. 3, 2020

(30) Foreign Application Priority Data

Oct. 7, 2017 (EP) .................................... 17195352

(51) Int. Cl.
H04W 56/00 (2009.01)
H04L 29/08 (2006.01)
H04W 84/18 (2009.01)

(52) U.S. Cl.
CPC ............. *H04W 56/00* (2013.01); *H04L 67/12* (2013.01); *H04W 84/18* (2013.01)

(58) Field of Classification Search
CPC .. H04J 3/06; H04L 7/00; H04L 67/12; H04W 56/00; H04W 84/18; G01S 5/0221; G01S 5/06
See application file for complete search history.

(56) References Cited

U.S. PATENT DOCUMENTS 6,201,499 B1 * 3/2001 Hawkes .................. G01S 1/045
342/387
7,391,368 B1 * 6/2008 Gao ....................... G01S 5/0215
342/387

(Continued)

FOREIGN PATENT DOCUMENTS

EP 2256511 A1 * 12/2010 ........... G01S 5/0205
EP 2642311 A1 9/2013

OTHER PUBLICATIONS

Zhu et al., "Sub-sample high-resolution TOA estimation algorithm for LTE downlink", 2017 IEEE 9th International Conference on Communication Software and Networks (ICCSN),IEEE, May 6, 2017, pp. 939-942.

(Continued)

*Primary Examiner* — Asad M Nawaz
*Assistant Examiner* — Thomas R Cairns
(74) *Attorney, Agent, or Firm* — K& L Gates LLP (57) ABSTRACT The invention provides a system and method of identifying when a message is received at a control station from at least one device in a network having a plurality of devices, said method comprising the steps of receiving at the control (Continued)

station a low bandwidth signal from at least one device; obtaining a coarse timestamp estimate of when said low bandwidth signal is received by correlating with a pre-programmed signal template; generating a higher resolution correlation estimate by phase shifting the pre-programmed signal template and repeating the correlation; and detecting where the correlation is above a preselected value; and applying a curve fitting function about the higher resolution correlation estimate to obtain an accurate timestamp when the message was received.

17 Claims, 5 Drawing Sheets

(56) References Cited

U.S. PATENT DOCUMENTS

| | | | | |
|---|---|---|---|---|
| 8,041,336 B2* | 10/2011 | McGrady | ............ | G01S 5/0221 |
| | | | | 455/404.2 |
| 8,874,398 B2* | 10/2014 | Raghupathy | ............ | G01S 5/021 |
| | | | | 702/94 |
| 9,176,217 B2* | 11/2015 | Krasner | .................... | G01S 1/24 |
| 10,455,350 B2* | 10/2019 | Kratz | ...................... | H04W 4/02 |
| 2002/0059535 A1 | 5/2002 | Bekritsky et al. | | |
| 2005/0078735 A1* | 4/2005 | Baker | .................... | H04B 1/719 |
| | | | | 375/130 |
| 2007/0025738 A1* | 2/2007 | Moore | .............. | H04B 10/1149 |
| | | | | 398/189 |
| 2014/0012518 A1* | 1/2014 | Ramamurthy | .......... | G01F 1/668 |
| | | | | 702/48 |
| 2019/0195999 A1* | 6/2019 | Shiba | ...................... | G01S 13/56 |

OTHER PUBLICATIONS

International Search Report and Written Opinion for International application No. PCT/EP2018/077366, dated Jan. 24, 2019 (15pages).

* cited by examiner

SYSTEM AND METHOD TO ENHANCE RANGING RESOLUTION FOR LOCALIZATION OF A LORA SENSOR OR DEVICE

CROSS REFERENCE TO RELATED APPLICATIONS

This is the national phase under 35 U.S.C. § 371 of International Application No. PCT/EP2018/077366, filed on Oct. 8, 2018, which claims priority to and the benefit of European Patent Application No. 17195352.4 filed on Oct. 7, 2017, the entire disclosures of each of which are incorporated by reference herein.

FIELD

The disclosure relates to a system and method to enhance Ranging Resolution for localization of LoRa Sensors or devices.

BACKGROUND

In general, the Low Power Wide Area Internet-of-Things (IoT) wireless sensor networks operate in very narrow radio channels. This causes huge ambiguity when time-difference-of-arrival (TDoA) is used for localization of the sensors.

Before dealing with complexity of triangulation of sensor nodes in LoRa networks, the problem of low granularity of ranging measurements due to low system bandwidth needs to be addressed.

Figure 1:
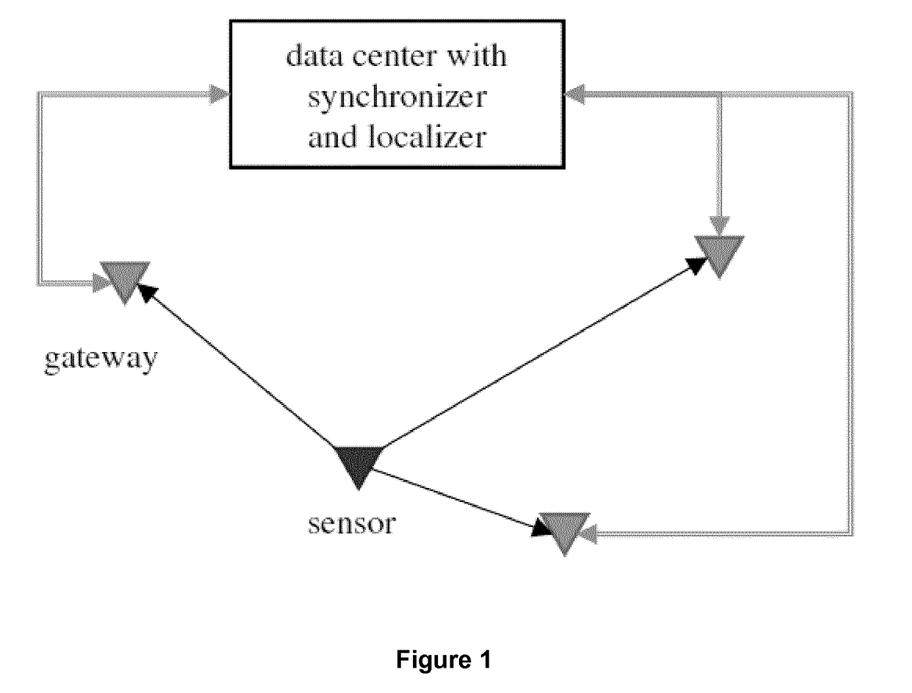
FIG. 1 illustrates a prior art LoRa networks are designed to provide connectivity for remote sensors over long distances.

As a part of the Internet-of-Things (IoT) paradigm, LoRa networks are designed to provide connectivity for remote sensors over long distances. To that goal, the network architecture, illustrated in FIG. 1, is based on a number of spatially distributed gateways which forward wireless packets from sensors over a wired or a typically cellular wireless connection to one or more data centres. To reduce energy consumption on the sensors, their transmissions must be delivered across several kilometers or even tens of kilometers with minimum transmit power. Therefore, to improve reliability the gateways are deployed in a relatively dense manner, albeit many kilometres apart, so that typically a few gateways receive the same packet.

One desirable network feature would be the ability to localize the sensors without use of any additional power consuming hardware like Global Positioning System (GPS) devices. The inherent redundancy in reception at multiple locations provides the means for localization of sensors based solely on their transmissions. Putting aside practical issues with signal level calibration and precise time synchronization, it is known that at low signal-to-noise ratios (SNRs) the timestamping based trilateration methods outperform the signal strength based methods. Furthermore, to avoid power consumption for precise clock synchronization on the sensors, the Time-Difference-of-Arrival (TDoA) rather than the Time-of-Arrival (ToA) remains the leading system design choice.

However, the fundamental problem in implementation of TDoA localisation is high granularity of measured timestamps due to very low temporal resolution determined by the sampling interval $\Delta t$. When taking into account the speed of light in the air c, the spatial resolution is inversely proportional to a 125 kHz signal bandwidth denoted with $f_1$:

$$\Delta d = c\Delta t = \frac{c}{f_1}.$$

The resulting ambiguity is $$\pm \frac{\Delta d}{2} = \pm 1200 \text{ m}.$$

In summary, typical solutions where location is required in a wide area there are two main solutions widely available, RSSI based and GPS based. The first gives accuracy of circa 1 km, while the second gives accuracy of 1-5 m. The advantage of RSSI it requires no GPS receiver and hence is lower cost and has longer life as GPS is expensive on batteries, whereas the GPS is more accurate for more expensive in cost and battery life. An alternative is emerging using Time difference of arrival to improve the accuracy over RSSI but keep the low cost and battery life characteristics, which are inherently desirable Low Power Wide Area Internet-of-Things (IoT) wireless sensor networks. The problem in implementation of TDoA localization is high granularity of measured timestamps due to very low temporal resolution determined by the sampling interval $\Delta t$.

European Patent Publication number EP2642311, Medav GMBH, discloses interpolation of two signals to provide a higher correlation accuracy by giving more samples on a correlation curve. The prior art increases the sample frequency of both signals to provide a correlation i.e. delta t is reduced either by sampling the incoming signal at higher rates or interpolating the incoming signal. This has the effect of causing the correlation function to be much more computationally intensive which is not suitable or feasible in Low Power Wide Area Internet-of-Things (IoT) wireless sensor network applications.

It is therefore an object of the invention to improve the ability to timestamp arriving messages from sensors or devices to a receiving station, and hence improve the accuracy of such TDOA systems.

SUMMARY

According to the invention there is provided, as set out in the appended claims, a method of identifying when a message is received at a control station from at least one device in a network having a plurality of devices, said method comprising the steps of:
  receiving at the control station a low bandwidth signal from at least one device;
  obtaining a coarse timestamp estimate of when said low bandwidth signal is received by correlating with a pre-programmed signal template and detecting where the correlation is above a preselected value;
  generating a higher resolution correlation estimate by phase shifting the pre-programmed signal template and repeating the correlation; and
  applying a curve fitting function about the higher resolution correlation estimate to obtain an accurate timestamp when the message was received.

To overcome the above mentioned problem a solution which, without signal oversampling, is provided by separating estimation of timestamps in two stages. First, a receiver cross-correlates the low bandwidth signal to determine a coarse timestamp estimate. Second, to fine-tune the coarse estimate, the same narrow band signal is correlated again with its template having much higher time granularity, but only over a narrow interval around the coarse estimate. It will be appreciated that there are alternatives to using a second correlation, such as a peak detect with lots of oversampling. Basic correlation will only provide the same time sample resolution as the incoming data sample rate. For example needs to be 1 GHz for 1ns accuracy, which 1 MHz can be used to give 1ns accuracy with a curve fit.

The two-stage sequential search according to one embodiment of the invention has two advantages:

The received signal does not need to be oversampled. Initial low sampling rate can be maintained since only the signal reference in the correlator is oversampled.

In comparison to simple physical oversampling, the number of computations needed to determine the estimate is significantly reduced.

Further improvement can be achieved if the signal is oversampled just enough to accommodate for its slight frequency offset before the consecutive correlations.

It will be appreciated that the invention uses a phase shifted reference signal which is not interpolated. This means that the reference signal is the actual signal rather than a reference signal which results in the computation being much less as only the initial samples are used in the calculation rather than interpolation of both signals. For example with interpolation by a factor of 10, with n samples, mean each correlation point is n×10 times n×10=$n^2$×100, whereas using a phase shifted signal still gives us n sample points but these are shifted in time rather than higher resolution and give n×n for each point.

In one embodiment the curve fitting function comprises an nth order polynomial fit.

In one embodiment the curve fitting function comprises a Gaussian fit or poisson fit or linear fit function.

In one embodiment the curve fitting function generates coefficients to determine a peak of said signal.

In one embodiment the pre-programmed signal template comprises a reference signal generated or a mathematically modelled signal template.

In one embodiment there is provided the step of using a phase shifted reference signal or plurality of phase shifted signals to generate a higher resolution correlation.

In one embodiment the network is a Low Power Wide Area Internet-of-Things (IoT) wireless sensor network.

In one embodiment there is provided the step of using a reference device where its location is known to reference the time at the control station.

In one embodiment there is provided the steps of using a timestamp of reference devices where the location is known to provide an accurate reference timestamp at a control station, and synchronising the timestamp reference between multiple control stations that receive the same low frequency signal.

In one embodiment the low bandwidth signal comprises a sequence counter so that individual signals from the same device can be differentiated, and to collate timestamps data from a plurality control stations that have received and timestamped the same transmission from a single device.

In one embodiment there is provided the step of interpolating two reference signals from at least one reference device received at the control station which have arrived before and after the received message to provide a first reference signal with a known timestamp and a second reference signal with a known timestamp to allow an interpolation of the reference between the two signals.

In one embodiment a Cramer-Rao lower bound (CRLB) in additive white noise for signal-to-noise ratios (SNRs) is applied.

In one embodiment there is provided the step of phase shifting the pre-programmed signal template and repeating the correlation generates additional points proximate to a correlation peak.

In one embodiment there is provided the step of generating a higher resolution correlation estimate comprises a further step of generating a high resolution correlation curve by using a plurality of phase shifted pre-programmed signal templates.

In one embodiment there is provided a method that allows reference devices rather than GPS signals to be used as a time reference. While the error of using a reference device is equal to the error of the measurement, many such devices can be used. This means that GPS receivers are not required at gateways reducing their cost and improving accuracy.

In one embodiment the invention provides much greater accuracy than typically used methods. It uses information from the full curve of the peak and can in addition be weighted. This is far superior to previous approaches taken.

In one embodiment the use of interpolation rather than extrapolation which is normally used can improve results and allow or greater time period between samples, as each measurement is less than half the time from a sample for the same sample rate.

In one embodiment the method is applied on the receiver side without need for changes in the communication protocol on the physical or the medium access layer. The method is very simple and provides significant quantifiable improvement in timing estimation.

In another embodiment there is provided system of identifying when a message is received at a control station from at least one device in a network having a plurality of devices, said method comprising the steps of:

a receiver at the control station to receive a low bandwidth signal from at least one device;

a module for obtaining a coarse timestamp estimate of said low bandwidth signal by correlating with a pre-programmed signal template and detecting where the correlation is above a preselected value;

a module for generating a higher resolution correlation estimate by phase shifting the pre-programmed signal template and repeating the correlation; and a module for applying a curve fitting function about the higher resolution correlation estimate to obtain an accurate timestamp when the message was received.

In one embodiment the pre-programmed signal template comprises a reference signal generated or a mathematically modelled signal template.

In one embodiment there is provided a module to use a phase shifted reference signal or plurality of phase shifted signals to generate a higher resolution correlation.

In one embodiment the network is a Low Power Wide Area Internet-of-Things (IoT) wireless sensor network.

In one embodiment there is provided a module configured to use a timestamp of reference devices where the location is known to provide an accurate reference timestamp at a control station, and synchronising the timestamp reference between multiple control stations that receive the same low frequency signal.

In one embodiment the low bandwidth signal comprises a sequence counter so that individual signals from the same device can be differentiated, and to collate timestamps data from a plurality control stations that have received and timestamped the same transmission from a single device.

In one embodiment there is provided a module for phase shifting the pre-programmed signal template and repeating the correlation to generate additional points proximate to a correlation peak.

In one embodiment there is provided a module for generating a higher resolution correlation estimate is further configured to generate a high resolution correlation curve by using a plurality of phase shifted pre-programmed signal templates.

In one embodiment the received signal is down-converted to an intentional non-zero frequency offset.

In one embodiment the method comprises the step of interpolating two reference signals from at least one reference device received at the control station which have arrived before and after the received message to provide a first reference signal with a known timestamp and a second reference signal with a known timestamp to allow an interpolation of the reference between the two signals.

In a further embodiment there is provided a method of identifying when a message is received at a control station from at least one device in a network having a plurality of devices, said method comprising the steps of:
- receiving at the control station a low bandwidth signal from at least one device;
- obtaining a coarse timestamp estimate of when said low bandwidth signal is received by correlating with a pre-programmed signal template and detecting where the correlation is above a preselected value; and
- applying a curve fitting function about the correlated estimate.

In another embodiment there is provided a system of identifying when a message is received at a control station from at least one device in a network having a plurality of devices, said method comprising the steps of:
- a receiver at the control station to receive a low bandwidth signal from at least one device;
- a module for obtaining a coarse timestamp estimate of said low bandwidth signal by correlating with a pre-programmed signal template and detecting where the correlation is above a preselected value; and
- a module for applying a curve fitting function about the correlated estimate to obtain an accurate timestamp when the message was received.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The problem of low granularity of ranging measurements due to low system bandwidth is addressed. According to one aspect of the invention a simple "channel gain and Gaussian noise" propagation model can be used as a starting point. Using the fact that the signal cross correlation maximizes likelihood and produces efficient estimates, a system which does not rely on excessive signal oversampling can be provided. This can be achieved by using the property of the correlator that for all practical SNRs its timing estimates reach a Cramer-Rao lower bound. In such a regime, the estimation process can be split into two stages.

At first, a coarse estimate is obtained using received low bandwidth signal. In the second stage, vicinity of the coarse estimate is systematically searched for a better estimate, only this time by correlating with the signal template having much higher sample rate, in other words in a way by virtually oversampling the signal. The numeric analysis shows that this approach achieves the same accuracy as the brute force oversampling, but with significantly lower computational complexity.

Furthermore, the invention can utilise the idea of actual but low rate signal oversampling to accommodate its down-conversion to a non-zero intermediate frequency. This idea is relevant since larger mean square bandwidth of the signal results in lower estimation spread. Both the simple analysis and the numeric evaluation show that this is indeed the case. Owing to the quadratic relationship between the Cramer-Rao bound and the IF frequency, the standard deviation decreases by the same factor by which the IF increases.

In an exemplary embodiment of the invention there is provided a method and system of identifying when a message is received at a control station from at least one device in a network having a plurality of devices. The network is preferably a Low Power Wide Area Internet-of-Things (IoT) wireless sensor network which operates in very narrow radio channels.

The control station can be referred to as a node, a gateway or base station and is a familiar term used in the art. At the control station a low bandwidth signal from the at least one device is received. A coarse timestamp estimate of the low bandwidth signal is obtained. This coarse timestamp estimate is correlated with a pre-programmed signal template stored at the base station. The stored signal template is that of a known referenced device in the network. A curve fitting function can then be applied to obtain a more accurate timestamp identifying a message from said at least one device to be identified. The pre-programmed signal template comprises a reference signal generated or a mathematically modelled signal template. A phase shifted reference signal or plurality of phase shifted signals can be used to generate a higher resolution correlation. The level of correlation can be selected to be above a threshold and changes according to preselected criteria.

Example Operation

It will be appreciated, as described above, that a preprogramed signal template would normally be generated at the same sampling frequency as the samples gathered of the received signal. For a low bandwidth signal this results in a very coarse resolution of correlation, which means there are only a small number of samples to determine the correlation peak and hence the time of arrival of the incoming signal.

TABLE show resolutions correlation curve and time resolution based on sampling frequency

| Signal Frequency | Sampling Frequency | Time Resolution | Distance Resolution |
|---|---|---|---|
| 1 MHz | 2 MHz | 0.5 us | 83 m |
| 500 KHz | 1 MHz | 1 us | 166 m |
| 250 KHz | 500 KHz | 2 us | 333 m |
| 125 KHz | 250 KHz | 4 us | 666 m |

From this table as the signal frequency is sampled at Nyquist frequency, the ability to accurately timestamp the arrival of a signal is directly related to the accuracy with which the location of the source of the signal can be determined. As can be seen from the table as the signal frequency drops to 125 KHz the accuracy drops to +−0.67 km which is not very useful.

In operation, the received signal is sampled at a period of $\Delta t$, where the sampling frequency fs is:

$$f_s = \frac{1}{\Delta t}$$

The received signal is a set of samples T at this time interval where n denotes the nth sample.

$T(n\Delta t)$

A reference signal is used which has length N+1 and is a sampled set of reference signal $R(i\Delta t)$ where $i >= 0, i <= N$ The initial correlation is performed where C(t) is the correlation between the received signal at the reference signal at time t.

$$C(n\Delta t) = \frac{\sum_{m=0}^{m=N} T((n-m)\Delta t)R((N-m)\Delta t)}{\sqrt{\sum_{m=0}^{m=N}|T((n-m)\Delta t)|^2}\sqrt{\sum_{m=0}^{m=N}|R((N-m)\Delta t)|^2}}$$

This correlation when it is above a threshold it indicates a signal has been received that matches the reference signal. When such a threshold is exceeded the correlation can be calculated at higher resolution using a phase shifted signal.

For example, with K separate phases, the reference signal is generated where k is the current phase out of K−1 values. This divides the time period $\Delta t$ into K slots. The reference signal is now $$R\left(N\Delta t + \frac{k}{K}\Delta t\right)$$

where k is the current phase (k>=0 to k<K)

Then to obtain a higher resolution correlation can be obtained using:

$$C\left(n\Delta t + \frac{k}{K}\Delta t\right) = \frac{\sum_{m=0}^{m=M} T((n-m)\Delta t)R\left((N-m)\Delta t + \frac{k}{K}\Delta t\right)}{\sqrt{\sum_{m=0}^{m=M}|T((n-m)\Delta t)|^2}\sqrt{\sum_{m=0}^{m=M}\left|R\left((N-m)\Delta t + \frac{k}{K}\Delta t\right)\right|^2}}$$

Where k is the current phase. In this way the cross correlation can be calculated at a time interval of $\Delta t/K$, and the effective sampling frequency is K*fs. This means the accuracy at which the correlation peak can be determined has a much higher resolution and hence can be determined at higher accuracy.

In this way the correlation value can be calculated for intermediate values between each sample that gives higher resolution on any correlation peak, where the peak of the correlation denotes when the incoming signal is most similar to the reference signal and hence from the correlation curve determining the peak corresponds to measuring the time of arrival of the received signal.

Normally this is performed on a known part of the incoming message only as the payload part of the message will be different for each message. This can be performed on the preamble of the incoming message which is the same for all transmitted signals.

It will be appreciated that other correlation equations can be used such as with IQ samples mapped to complex form, but the principle of above remains the same.

Using Reference Devices to Get Time Stamp as GPS

Optimum localisation of devices for improving accuracy of the time resolved time difference of arrival (TDOA). Dead centre of multiple sensors at different places in the localisation space can be calculated.

This idea revolves around the ability to assist in the referencing and generation of localisation signatures from known referenced devices (of very accurately known locations) in order for processing of TDOA raw signals so as to arrive at a more accurate estimate of the location of other devices within the localisation area defined by one or more reference gateways.

Such devices can:

Transmit specific packets/symbols, of varying size and payloads,

Symbols and packets can have specific inter-symbol relationships.

Support other assistive features including multi antenna with directionality and polarisation specific features.

Depending on the network area, there may be multiple reference devices employed. Multiple devices should be deployed at specific points in 2, 3 dimensions.

Multiple devices should be strategically deployed so as to provide "waypoint" and "transit points/pathways" from which not only point signatures can be captured, but relationships between devices can also be inferred and used to compensate more fully.

Figure 2:
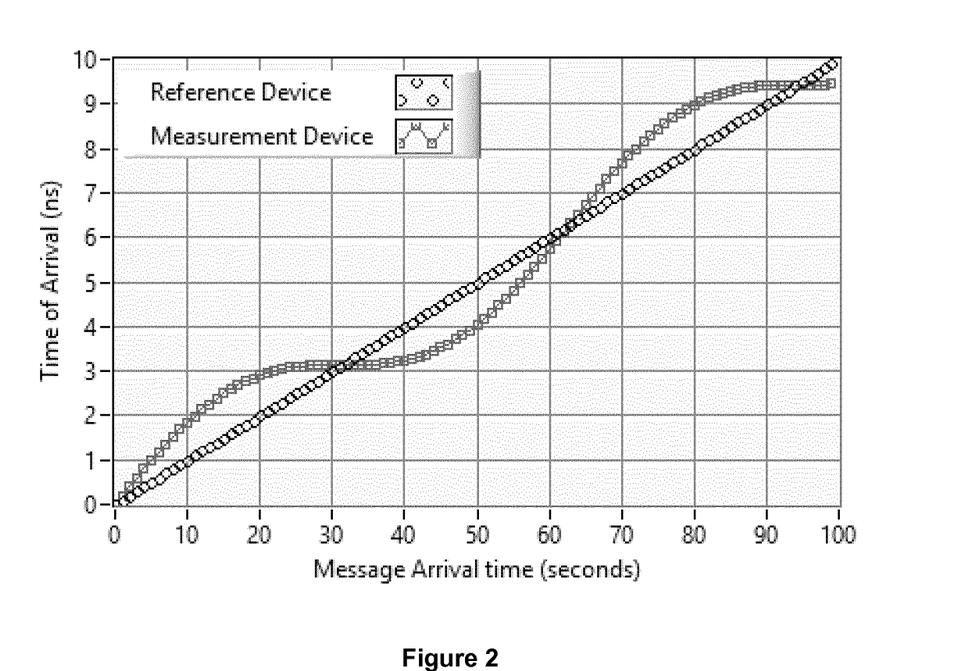
FIG. 2 shows a typical time o arrival plot for two devices where one is a reference device (its location is known) and the second is the measurement device.
Figure 3:
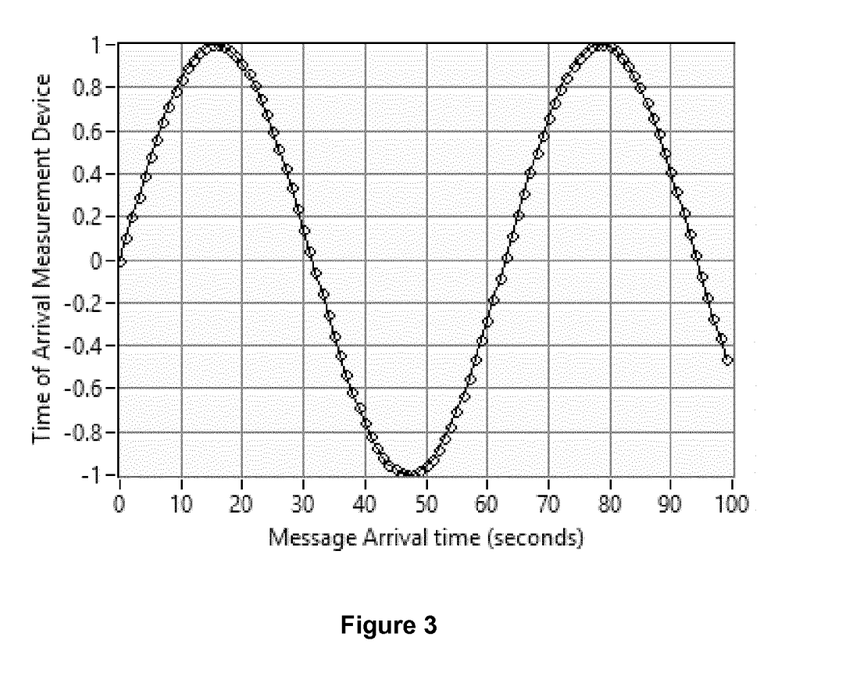
FIG. 3 illustrates the difference in the two measurement plots is the relative time of arrival of the measurement device to the reference measurement device.

FIG. 2 shows a typical time of arrival plot for two devices where one is a reference device (its location is known) and the second is the measurement device. The time of arrival of both devices is recorded for each message, where 0 is the arrival of the first message. The difference in the two measurement plots is the relative time of arrival of the measurement device to the reference measurement device as shown in FIG. 3. This result can be subtracted from the same result from another gateway to give the relative TDOA of the measurement device to the reference device. The actual TDOA is this value added to the TDOA of the reference device which can be calculated as the locations of the receivers is known. It will be appreciated that other measurements can be used to obtain a coarse measurement.

Use of Curve Fitting of Correlation Curve to Get Accurate Timestamp

There are many possible methods to determine the time of arrival of a message. The invention in this case is the determination of the time of arrival using a curve fitting approach rather than a threshold or peak detect or interpolation.

This has the advantage of using all the information from each data point rather than just a few, and the points with the highest slope (largest time discrimination) are weighted the most by the curve fit.

Figure 4:
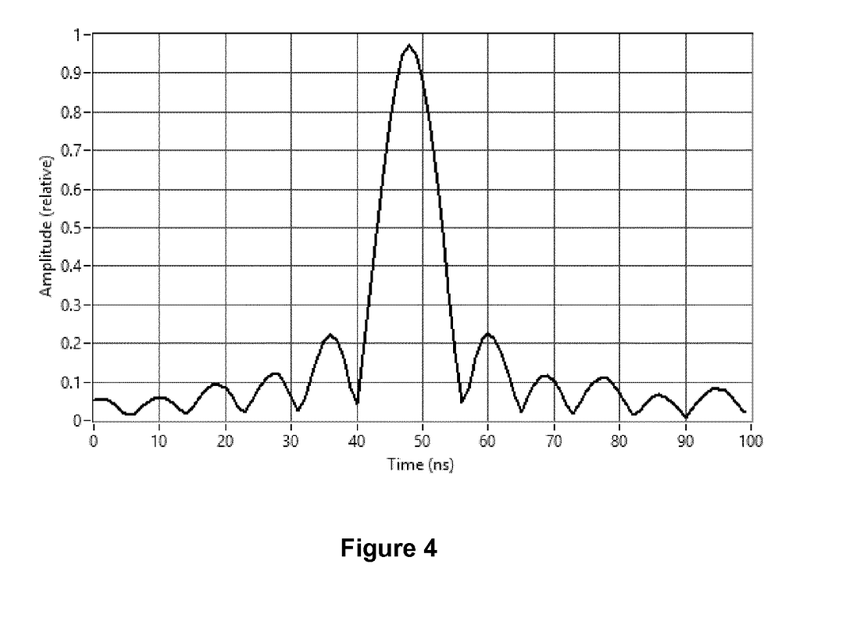
FIG. 4 shows a normal correlation curve obtained from the correlation of a measurement signal with a reference signal.
Figure 5:
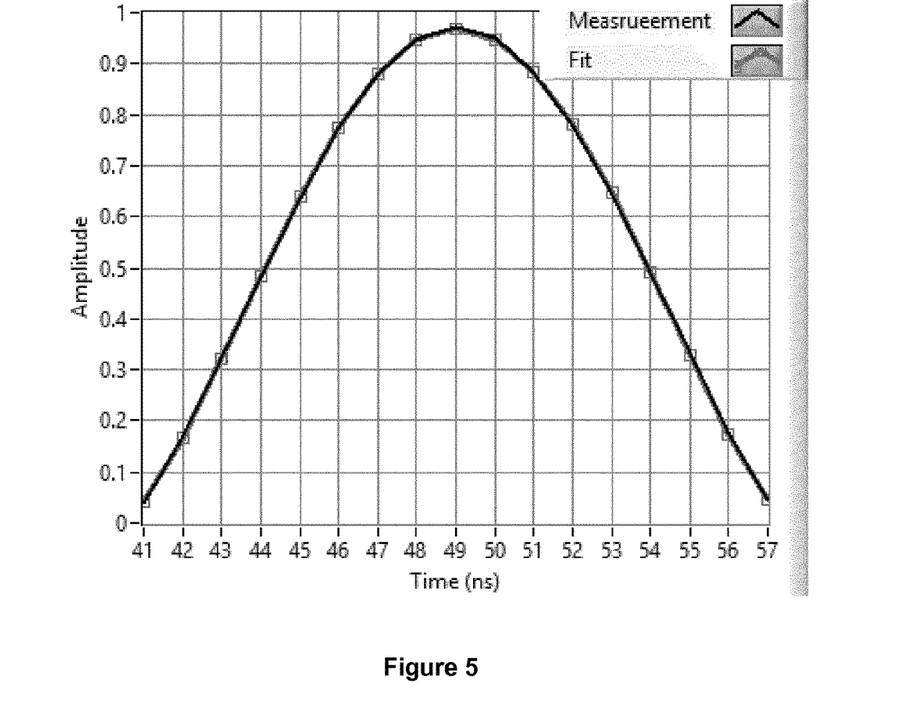
FIG. 5 shows the central part of the correlation curve corresponding to the peak.

FIG. 4 shows a normal correlation curve obtained from the correlation of a measurement signal with a reference signal. The peak of the correlation curve denotes the point in time that the measurement signal is most equivalent or similar to the reference signal. This denotes the time of arrival of the message. The ability to determine the peak of this curve will limit the accuracy of the system and ultimately the accuracy with which a device which sent the messages position can be determined. FIG. 5 shows the central part of the correlation curve corresponding to the peak. A curve fit is shown in red (with circular markers) which in this case is a 4th order polynomial fit. It will be appreciated that other types of fit can be used, such as a Gaussian fit or poisson fit or linear fit function. From the coefficients determining the peak is straightforward and provides much greater ability to determine the peak than other methods such as detecting the peak point or mean 3 dB threshold intersection points. It should be noted that most of the time stamping information is in the higher slope sides of the peak rather than the points close to the peak as the slope here is lower and harder to discriminate between the points and noise has a much bigger impact.

Extrapolation vs Interpolation of Sample vs Reference Device Messages

When a reference device is used to determine the clock, this will send its message periodically. Rather than a reference being generated from each distinct message and using this as the reference for timestamping of incoming sensors messages, it is better to use two reference messages which have arrived before and after to allow an interpolation of the reference between the two messages, rather than an extrapolation of the reference from previous samples.

Figure 6:
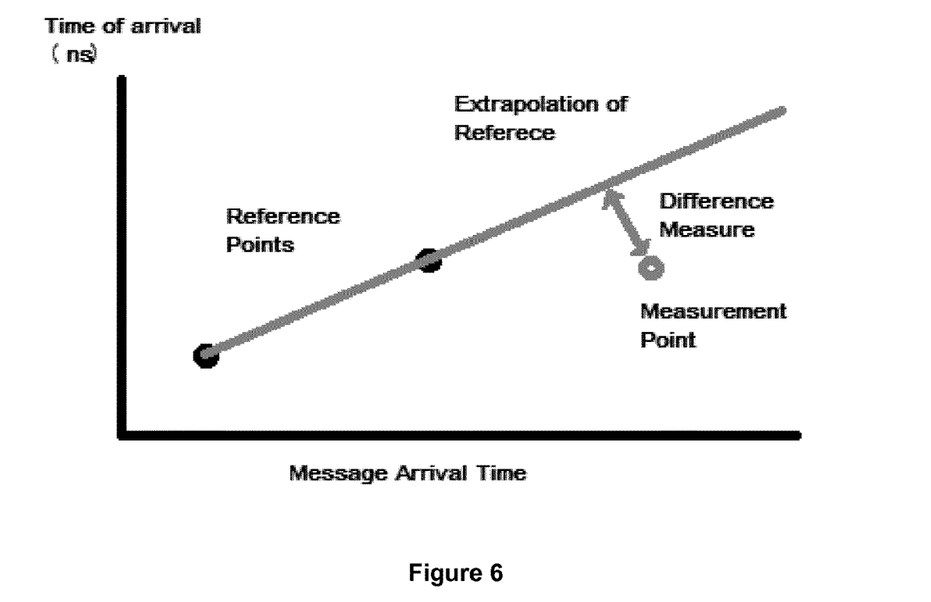
FIGS. 6 & 7 are graphs which show the difference between using extrapolation (FIG. 6) and Interpolation (FIG. 7)
Figure 7:
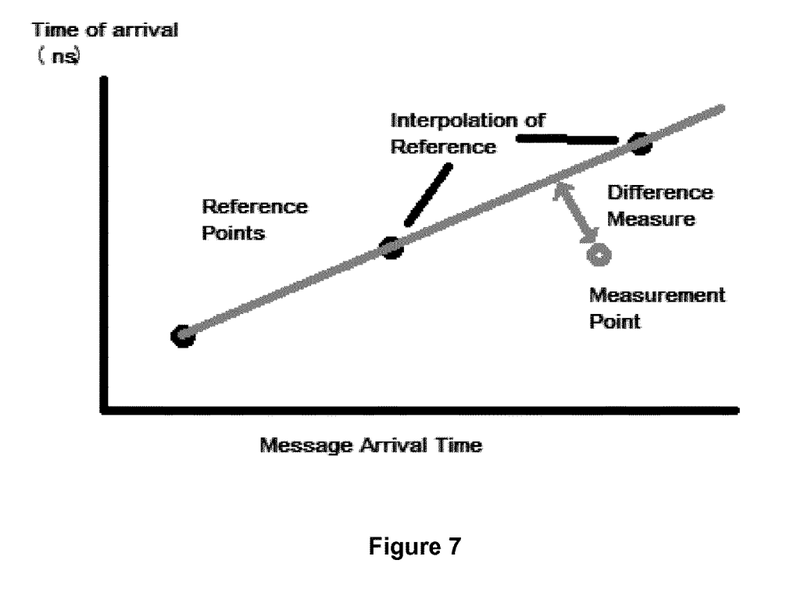

The graphs show the difference between using extrapolation (FIG. 6) and Interpolation (FIG. 7). The extrapolation shows that the reference line is estimated from the previous points and the difference value is calculated from the reference line and the measurement point. The interpolation shows that the reference line is always interpolated between two reference points, and the measurement value is calculated in the same way. The interpolation is more accurate as it will in general have a measurement point closer than the extrapolation case 50% of the time. This means waiting until the next reference point is measured before calculation of the difference value.

In an example operation a timestamp of reference devices can be used where the location is known to provide an accurate reference timestamp at a control station, and synchronising the timestamp reference between multiple control stations that receive the same low frequency signal.

In addition, the low bandwidth signal comprises a sequence counter so that individual signals from the same device can be differentiated, and to collate timestamps data from a plurality control stations that have received and timestamped the same transmission from a single device.

The system and method can be configured to interpolate two reference signals from at least one reference device received at the control station which have arrived before and after the received message to provide a first reference signal with a known timestamp and a second reference signal with a known timestamp to allow an interpolation of the reference between the two signals.

Intermediate Frequency (IF) Sweeping and Sampling of the Rise of the IF

Figure 8:
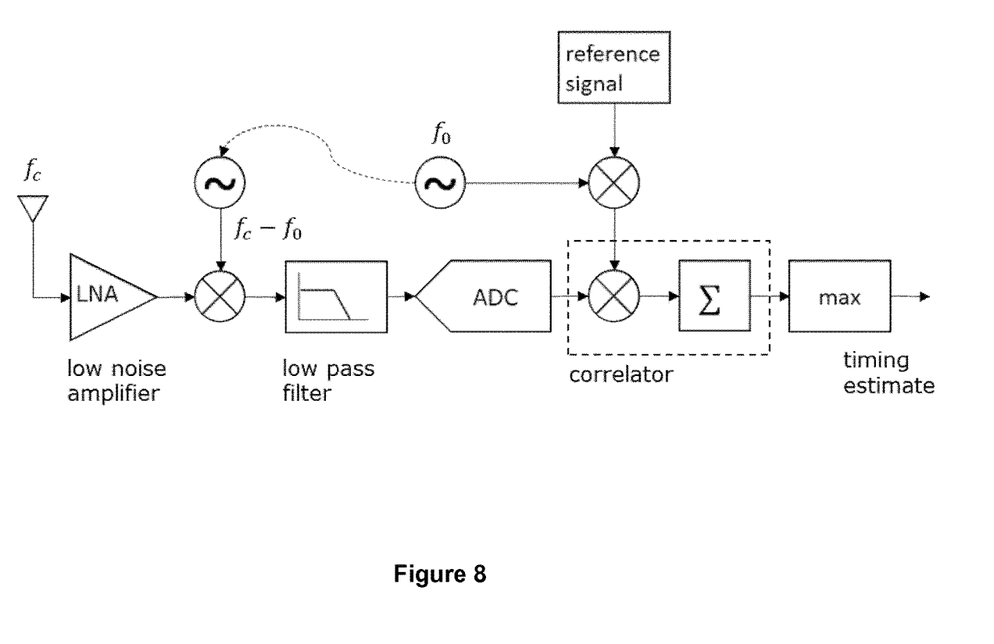
FIG. 8 illustrates a sampling circuit according to one embodiment of the invention.

FIG. 8 illustrates sampling circuit according to one embodiment of the invention.

Figure 9:
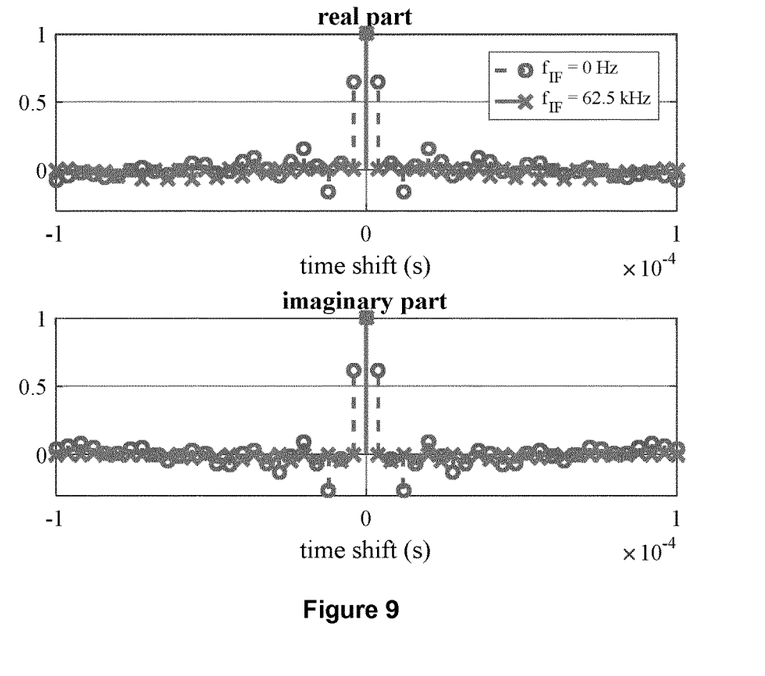
FIG. 9 illustrates oversampling of the frequency.

Packet arrival time is determined from the peak of the cross correlation of noisy received signal with the stored signal template. The main lobe of the cross correlation exhibits finite width which makes it difficult to detect the exact timing of its peak in presence of noise. Down-conversion of the signal to an intermediate frequency above 0 Hz results in narrowing of the main lobe of cross correlation, making it easier (and more accurate) to detect the actual peak. In order to be able to do so the signal must be slightly oversampled. In other words the received signal can be downconverted to an intentional non-zero frequency offset. In FIG. 9 is represented the case when the 125 kHz signal is oversampled 2 times and then down-converted to 62.5 kHz centre frequency.

When observed in the frequency domain, down-conversion of the received signal above the 0 Hz intermediate frequency results in broadening of the signal bandwidth. Since the temporal resolution inversely proportionally depends on the signal bandwidth, this results in better estimation the packet arrival time.

In an exemplary embodiment a signal is received from a radio wave at 868 MHz with signal bandwidth of 125 KHz. The receiver down-converts this using a reference signal typically at the centre of the received signal with an offset and in this embodiment is 868 MHz+an offset. An example offset is 62.5 KHz. The sampling frequency of the received signal should be the signal 2*(bandwidth+offset). Having the offset as a proportion of the signal bandwidth improves the ability to detect the arrival time of the incoming signal as this causes sides of the correlation peak to have higher slope and hence easier to determine the exact peak as these higher slope sides are less susceptible to noise.

Figure 10:
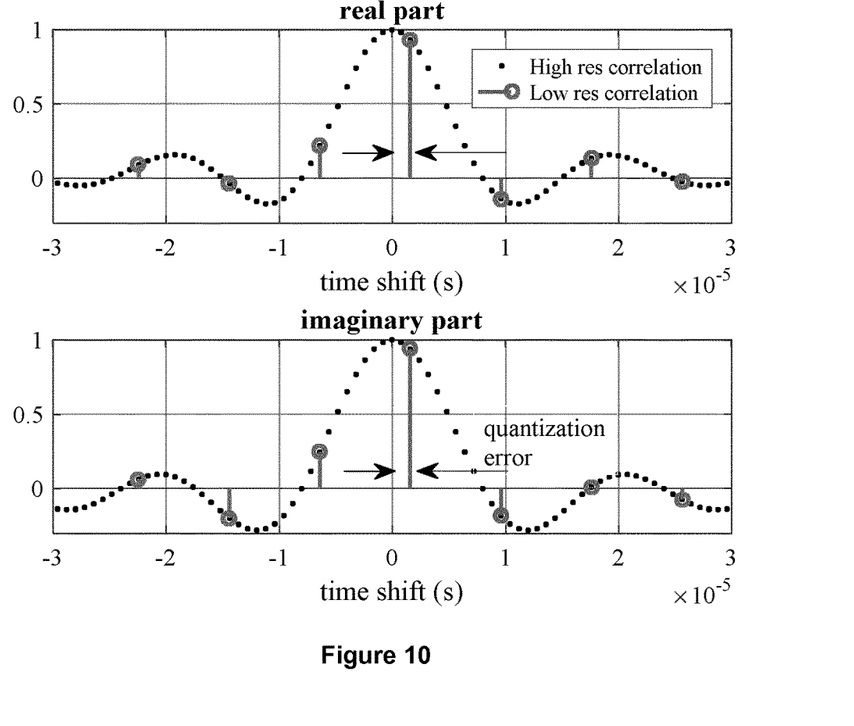
FIG. 10 illustrates using phase shifted reference signal to generate a higher resolution of correlation signal.

Using Phase Shifted Reference Signal to Generate Higher Resolution of Correlation Signal In FIG. 10 incoming down-converted ADC sampled data is correlated against a reference signal (sliding correlator), and when the correlation is high this corresponds to when a Lora signal has been received. The accurate detection of time of the peak of this correlation determines the time of arrival of the message.

Ideally the signal is sampled at Nyquist rates which optimises the ADC cost and number of sample points (which determines the processing requirement) but has the effect of leaving very few sample points on the peak of the correlation and causes large quantization (rounding) error in estimation of packet arrival time. When localizing transmitters based on the time of arrival, a quantization error on the order of microseconds results in spatial ambiguity of many hundreds of meters.

In this approach, the original low bandwidth signal is correlated in two steps: 1) correlation with the low bandwidth template of the signal to determine coarse arrival time; and 2) correlation with the fine-sampled signal template in a narrow interval around the coarse estimate to reduce quantization error. By phase shifting the reference signal and repeating the correlation, additional points can be obtained on the correlation peak, and hence a better estimate of the peak can be determined through more advanced peak detection algorithms such as curve fitting.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of identifying when a message is received at a control station from at least one device in a network having a plurality of devices, said method comprising the steps of:
   receiving at the control station a low bandwidth signal from at least one device;
   obtaining a coarse timestamp estimate of when said low bandwidth signal is received by correlating with a pre-programmed signal template and detecting where the correlation is above a preselected value;
   generating a higher resolution correlation estimate by phase shifting the pre-programmed signal template and repeating the correlation; and
   applying a curve fitting function about the higher resolution correlation estimate to obtain an accurate timestamp when the message was received.

2. The method of claim 1 wherein the curve fitting function comprises an nth order polynomial fit.

3. The method of claim 1 wherein the curve fitting function comprises a Gaussian fit or Poisson fit or linear fit function.

4. The method of claim 1 wherein the curve fitting function generates coefficients to determine a peak of said signal.

5. The method of claim 1 wherein the pre-programmed signal template comprises a reference signal generated or a mathematically modelled signal template.

6. The method of claim 1 wherein the step phase shifting uses a phase shifted reference signal or plurality of phase shifted reference signals to generate the higher resolution correlation.

7. The method of claim 1 wherein the step of phase shifting the pre-programmed signal template and repeating the correlation generates additional points proximate to a correlation peak.

8. The method of claim 1 wherein the step of generating a higher resolution correlation estimate comprises a further step of generating a high resolution correlation curve by using a plurality of phase shifted pre-programmed signal templates.

9. The method of claim 1 wherein the network is a Low Power Wide Area Internet-of-Things (IoT) wireless sensor network.

10. The method of claim 1 comprising using a timestamp of one or more reference devices where a location is known to provide an accurate reference timestamp at a control station, and synchronising the timestamp reference between multiple control stations that receive the low bandwidth signal.

11. The method of claim 1 comprising timestamping two reference signals from at least one reference device received at the control station which have arrived before and after the received message to provide a first reference signal with a known timestamp and a second reference signal with a known timestamp to allow an interpolation of the timestamp of the received message between the two signals.

12. A system of identifying when a message is received at a control station from at least one device in a network having a plurality of devices, comprising:
   a receiver at the control station to receive a low bandwidth signal from at least one device;
   wherein the control station is configured to:
   obtain a coarse timestamp estimate of said low bandwidth signal by correlating with a pre-programmed signal template and detecting where the correlation is above a preselected value;
   generate a higher resolution correlation estimate by phase shifting the pre-programmed signal template and repeating the correlation; and
   apply a curve fitting function about the higher resolution correlation estimate to obtain an accurate timestamp when the message was received.

13. The system of claim 12 wherein the pre-programmed signal template comprises a reference signal generated or a mathematically modelled signal template.

14. The system of claim 12 wherein the control station is configured to use a phase shifted reference signal or plurality of phase shifted signals to generate a higher resolution correlation.

15. The system of claim 12 wherein the control station is configured for phase shifting the pre-programmed signal template and repeating the correlation to generate additional points proximate to a correlation peak.

16. The system of claim 12 wherein the control station is further configured to generate a high resolution correlation curve by using a plurality of phase shifted pre-programmed signal templates.

17. The system of claim 12 wherein the network is a Low Power Wide Area Internet-of-Things (IoT) wireless sensor network.

* * * * *